US007179055B2

(12) United States Patent
Revene

(10) Patent No.: US 7,179,055 B2
(45) Date of Patent: Feb. 20, 2007

(54) MAILABLE FAN

(76) Inventor: Philip M. Revene, 12413 Pleasant Run Ter., Richmond, VA (US) 23233

( * ) Notice: Subject to any disclaimer, the term of this patent is extended or adjusted under 35 U.S.C. 154(b) by 82 days.

(21) Appl. No.: 11/012,309

(22) Filed: Dec. 16, 2004

(65) Prior Publication Data

US 2006/0133934 A1 Jun. 22, 2006

(51) Int. Cl.
*A01M 3/02* (2006.01)

(52) U.S. Cl. ........................ 416/70 A; 416/71; 416/72; 416/73

(58) Field of Classification Search .................. 416/69, 416/70, 71, 72, 73, 70 R, 70 A
See application file for complete search history.

(56) References Cited

U.S. PATENT DOCUMENTS

| | | | | |
|---|---|---|---|---|
| 874,957 | A | 12/1907 | Godley | |
| 1,126,797 | A | 2/1915 | Licheter | |
| 1,173,800 | A | 2/1916 | Hayes | |
| 1,231,104 | A | 6/1917 | Waggoner | |
| 1,261,482 | A | 4/1918 | Brewington | |
| 1,557,276 | A | 10/1925 | Stebblings | |
| 1,584,542 | A * | 5/1926 | Humphrey | 416/69 |
| 2,052,180 | A | 8/1936 | Klie | |
| 2,208,243 | A * | 7/1940 | Bittson | 416/72 |
| 2,346,596 | A | 4/1944 | Martin | |
| 2,371,792 | A * | 3/1945 | Bernstein | 416/72 |
| 2,420,782 | A * | 5/1947 | Klie | 416/70 R |
| 3,362,033 | A * | 1/1968 | Fee | 416/72 |
| 4,150,464 | A | 4/1979 | Tracy | |
| 4,352,630 | A | 10/1982 | Wallo | |
| 4,825,515 | A | 5/1989 | Wolterstorff, Jr. | |
| 2003/0129058 | A1 * | 7/2003 | Carollo | 416/5 |

* cited by examiner

*Primary Examiner*—Hoang Nguyen
(74) *Attorney, Agent, or Firm*—Christopher Wood; Wood & Eisenberg, PLLC

(57) ABSTRACT

A fan equipped with an unfolded fan blade adapted for mailing without requiring carriage in an envelope or packet. The unfolded fan comprises an unfolded fan blade, a handle attached to the unfolded fan blade, and indicia printed on one side of the unfolded fan blade. The handle is adapted to stiffen and reinforce the unfolded fan blade. The indicia define an area to attach or print postage and an area to write or print an address, and an optional area to write or print a message. In one embodiment, the handle is in the form of an elongated male member and an elongated female receptor member. In another embodiment, a method of mailing fans is provided, comprising the steps of providing a non-folded fan adapted for direct mailing.

9 Claims, 9 Drawing Sheets

MAILABLE FAN

CROSS-REFERENCE TO RELATED APPLICATIONS

Not Applicable.

STATEMENT REGARDING FEDERALLY SPONSORED RESEARCH OR DEVELOPMENT

Not Applicable.

SEQUENCE LISTING

Not Applicable.

FIELD OF THE INVENTION

The present invention relates generally to hand-held fans. More specifically, the invention is a mailable fan with a non-folded flat blade.

BACKGROUND OF THE INVENTION

Promotional products such as gift pens with company logo, diaries, calculators, crystal, calendars, and notepads are used to market and promote business products and services. Promotional material is often forwarded through the mail system such as the U.S. Post Office. Promotional material sent through the mail is often carried in dedicated envelopes such as printed envelopes. The step of inserting promotional material into dedicated envelopes adds cost. Thus, there is a need for promotional material that can be handled by, for example, the U.S. Post Office without requiring special packaging or use of envelopes.

Promotional material often lacks utility and hence reinforces the "junk mail" stereotype wherein the addressee liberally throws promotional material into a trash can almost upon receipt. Thus, there is a need for a promotional material that has distinct and separate utility beyond a boring promotional message and therefore less likely to be thrown upon receipt directly into a trash can.

In addition, novelty items are of intrinsic interest beyond their exploitation as promotional material to support a marketing effort. A novelty item mailed through, for example, the U.S. Post Office can have an agreeable effect upon receipt by the addressee. Thus, there is a need for novelty items that can be mailed directly without requiring packaging such as an envelope.

Novelty items such as fans adapted for mailing are known. Such mailable fans often require complicated folding along the fold-lines to enable the fan ready for use. However, fold-lines typically weaken the fan blade. To offset this problem a handle is sometimes pivoted to cross over fold lines. Thus, there is a latent need to overcome the problem of fold-lines.

A review of the prior art known to the Applicants follows.

U.S. Pat. No. 1,231,104, issued Jun. 26, 1917 to F. H. Waggoner, describes a fan that can be folded to make a flat, thin, parcel, so that it may be sent through the mail as a mailing card. In one embodiment, the '104 fan comprises a fan section A, and a handle D, wherein section A is folded to form two sections B and C. The handle is pivotally attached to the fan section C and in normal use lies across the fold separating sections B and C to enable the '104 device to be used as a fan. To mail the '104 device, fan section A is folded and the handle is positioned to lie between sections B and C. The presence of a fold between sections B and C presents a line of weakness such that when the '104 device is unfolded and used as a fan, section A has a tendency to buckle along the fold-line separating sections B and C. Thus, there is a need for an improved fan system that does not use a fold line.

U.S. Pat. No. 1,261,482, issued Apr. 2, 1918 to Brewington, describes a convertible post-card and fan comprising a sheet foldable on a central line to form front and rear folds, and a handle bar pivoted to each fold near the fold line; the bars are adapted to form a fan handle. The fold-line weakens the '482 device.

U.S. Pat. No. 2,052,180, issued Aug. 25, 1936 to Klie, describes a fan having a combined handle and blade formed from a single piece of thin cardboard. The handle portion is described as providing a natural grip and serves to distribute bending strain on the blade. The '180 device is not adapted to be sent through the mail.

U.S. Pat. No. 1,173,800, issued Feb. 29, 1916, to Hayes, describes a fan comprising a foldable blade and a set of intermediate bars pivotally connected to each other. While the '800 device is adapted to be sent through the mail, the intermediate bars add complexity to the device.

U.S. Pat. No. 2,346,596, issued Apr. 11, 1944 to Martin, describes an article comprising a sheet of paper provided with fold-lines along which it is foldable from an extended flat form to the size of a post card that can be refolded into a fan having a handle.

U.S. Pat. No. 4,352,630, issued Oct. 5, 1982 to Wallo, describes a hand fan assembly that comprises a fan body having an elongate handle socket extending inwardly from one edge of the fan body, and an elongate handle having a hand-grip portion and an extension stem projecting from the grip portion and adapted to be received in a socket. The fan body of the '630 device is adapted to be formed by folding panels together along a score line which may have a cut-out to receive the handle stem into the socket. In a kit package the fan body and the handle are enclosed in an envelope with the handle extending across a major dimension of the body.

U.S. Pat. No. 1,126,797, issued Feb. 2, 1915 to Licheter, describes a fan comprising a cardboard blade adapted to receive inscriptions, and a cardboard handle embracing the lower side of the blade. The handle is described as conforming in profile to the palm of a hand and having an opening suited to receive a thumb. The '797 patent is not suitable for mailing since it lacks printed information necessary to allow a person to successfully mail the '797 fan.

U.S. Pat. No. 874,957, issued Dec. 31, 1907 to Godley, describes a jewelry clasp having outer and inner clasp members. The outer clasp member has a cylindrical bore extending from one end and with slots extending through the walls of the outer clasp member at a point above the end of the bore. The forward and rear walls of the slots are inclined toward the forward, or open, end of the bore. The inner clasp member is adapted to be rotatably and slidably supported within the cylindrical bore, and heads projecting from the inner clasp member, the heads having independent inclined faces for engagement, respectively, with the forward and rearward inclined walls of the slots.

U.S. Pat. No. 4,150,464, issued Apr. 24, 1979 to Tracy, describes a buckle that includes separable cooperating receptacle and clasp members. The receptacle member includes a pair of locking slots formed in opposing sides thereof. The clasp member includes a pair of resilient arms having locking tabs thereon for releasably engaging the locking slots of the receptacle member. The receptacle member also includes a pair of grooves for slidably engaging cooperating raised ridges formed on a central arm of the clasp member for guiding said clasp member during insertion into and removal from the receptacle member. The central arm of the clasp member also includes a pair of laterally extending edges for defining a limit to the inward bending of the resilient arms. The receptacle also includes a belt end termination member including a slide member for adjusting the length of a belt looped around said slide member. The clasp member also includes a base member joining the three arms thereof and including a through slot for terminating a belt end or the like.

U.S. Pat. No. 4,825,515, issued May 2, 1989 to Wolterstorff, Jr., describes a safety buckle that is comprised of two, releasable, interlocking portions. One portion has outward flexing lateral arms with tabs connected to their leading ends. Positioned between the lateral arms is a central safety arm that flexes vertically and has a latching hook connected to its leading end. The arms flex slightly to facilitate insertion into the receiving portion. When fully inserted, the tabs of the lateral arm protrude into corresponding openings located on opposite sides of the receiving portion whereas the hook of the safety arm locks into a corresponding slot located on the back of the receiving portion.

U.S. Pat. No. 1,557,276, issued Oct. 13, 1925 to Stebbings, describes a fan that is designed to rest against the underside of the crown of a hat. The '276 hat fan comprises a fan element, a handle member slidably mounted on the fan for movement in a plane parallel with the plane of the fan. A yielding device is disposed between the fan and the handle to move the handle to an extended position.

None of the above patents and publications, taken either singularly or in combination, is seen to describe the instant invention as claimed.

SUMMARY OF THE INVENTION

A fan equipped with an unfolded fan blade adapted for mailing without requiring carriage in an envelope or packet. The unfolded fan comprises an unfolded fan blade, a handle attached to the unfolded fan blade, and indicia printed on one side of the unfolded fan blade. The handle is adapted to stiffen and reinforce the unfolded fan blade. The indicia define an area to attach or print postage and an area to write or print an address, and an optional area to write or print a message. In one embodiment, the handle is in the form of an elongated male member and an elongated female receptor member. In another embodiment, a method of mailing fans is provided, comprising the steps of providing a non-folded fan adapted for direct mailing.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
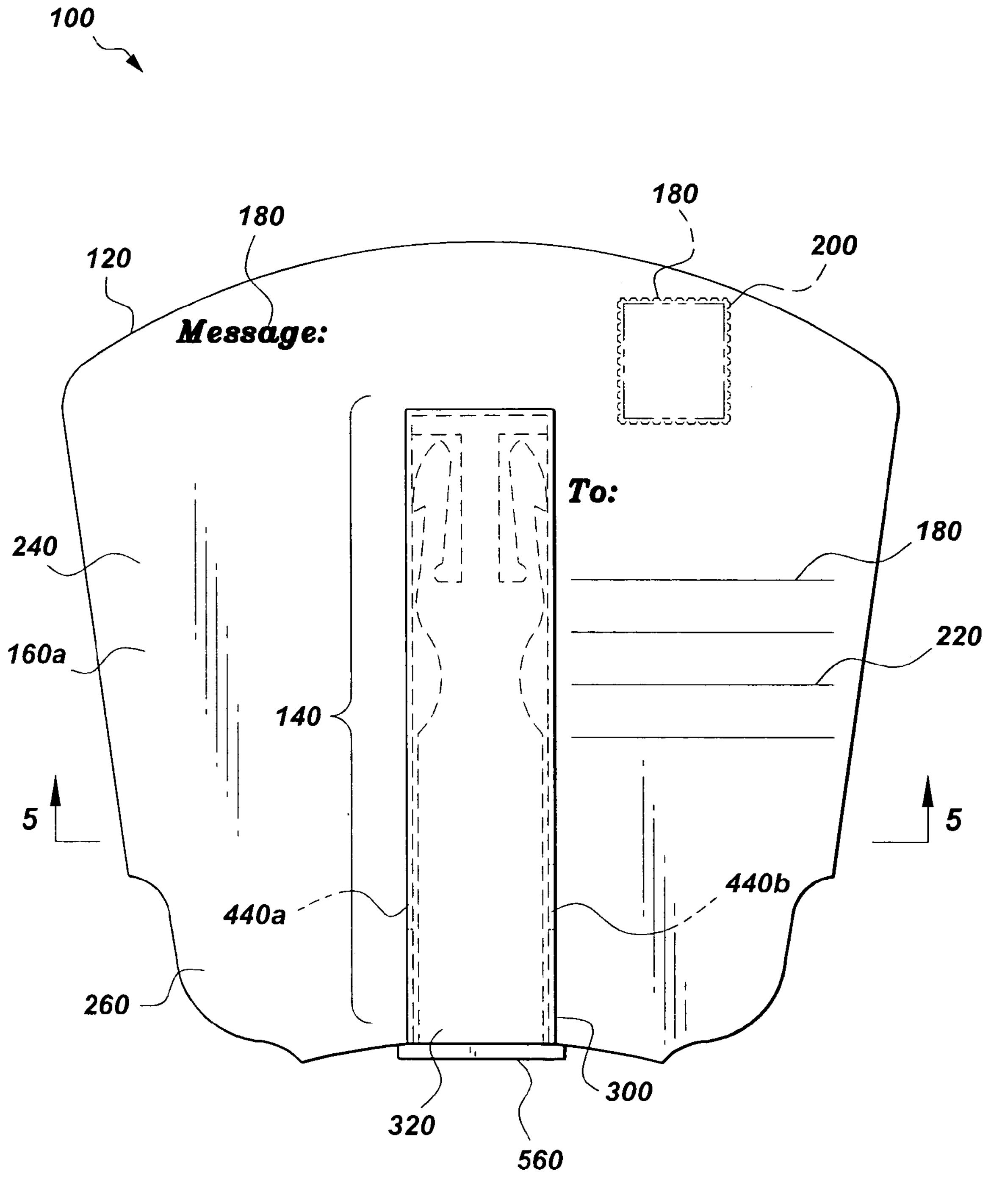
FIG. 1A shows a top view of one side of a mailable fan according to one embodiment of the present invention.
Figure 1B:
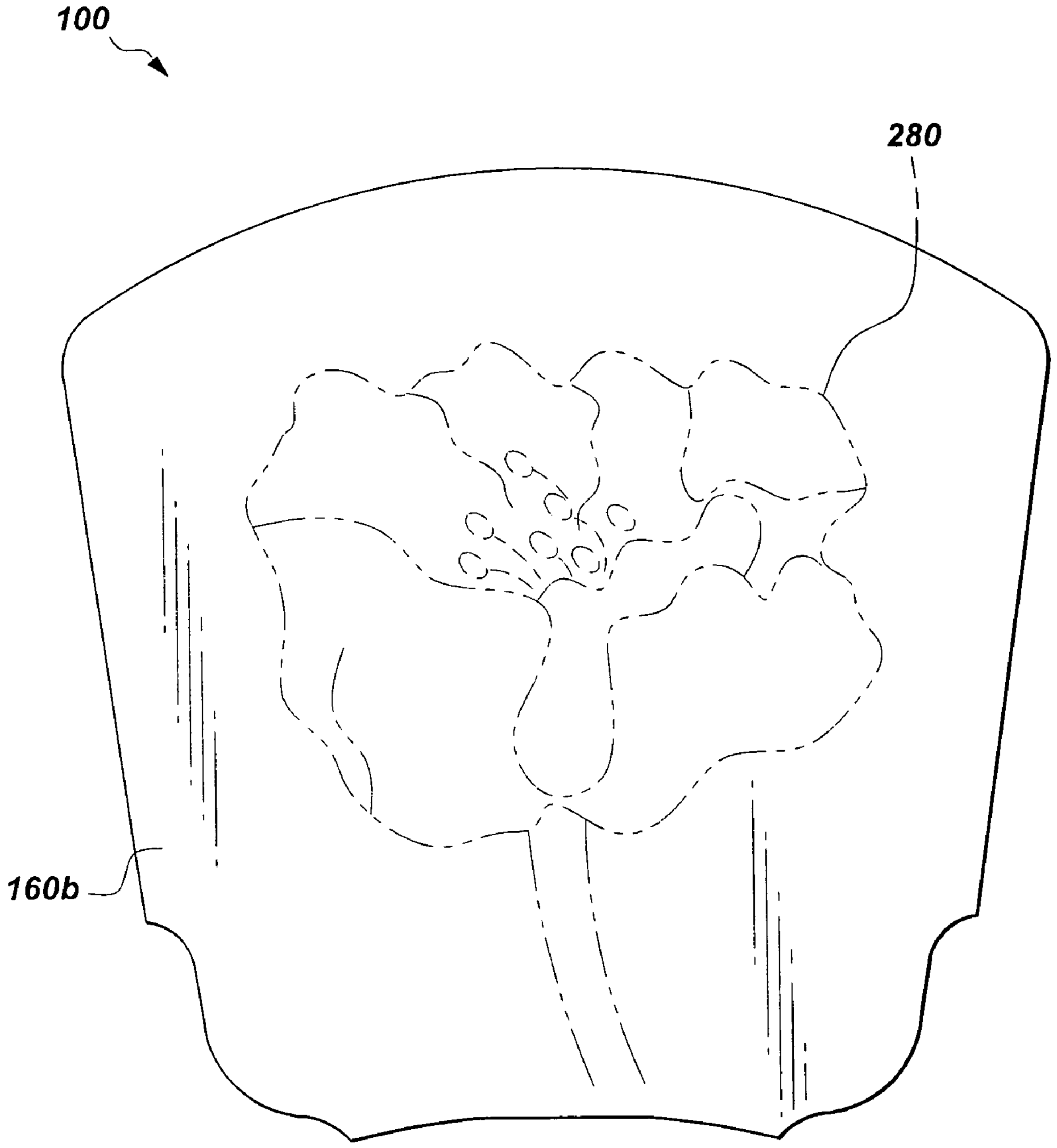
FIG. 1B is a bottom view of the mailable fan of FIG. 1A.
Figure 2:
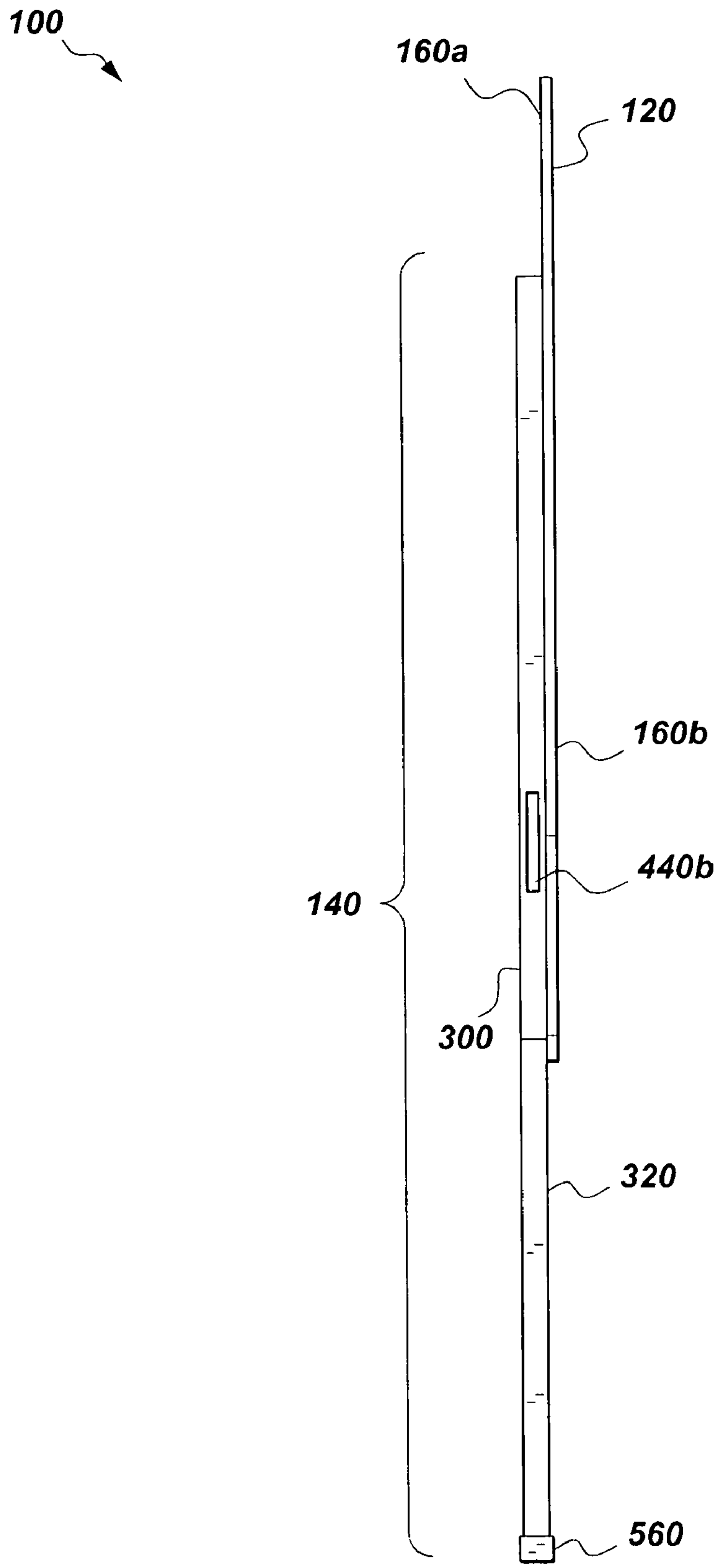
FIG. 2 is a side view of the mailable fan of FIG. 1A.

The present invention is directed to hand-held fans. More specifically, the invention is a mailable fan with a non-folded flat blade.

It should be understood that the term "mailable fan" refers to a fan that has been rendered suitable for mailing through, for example, the U.S. Postal Service according to the present invention, i.e., the mailable fan of the present invention comprises a flat unfolded fan blade that remains unfolded and flat both during passage through the mailing system and when used as a fan to, for example, cool a person's face. The mailable fan of the present invention does not require packaging into, for example, an envelope; the mailable fan of the present invention includes sufficient indicia to provide a post-card like face on one side of the unfolded fan blade. The terms "unfolded" and "non-folded" should be regarded as equivalent terms.

The mailable fan of the present invention is indicated generally by the numeral 100.

Referring to FIGS. 1A, 1B, 2, 3, 4 and 5 which show a mailable fan 100 according the first embodiment of the present invention. The mailable fan 100 comprises an unfolded fan blade 120 and an extendable handle 140. The unfolded fan blade 120 is substantially flat and has two opposite sides 160*a* and 160*b*; sides 160*a* and 160*b* can be regarded respectively as the top and bottom sides of unfolded fan blade 120. The unfolded fan blade 120 is formed in any desired shape so long as the size of the blade 120 conforms to postage regulations such as, but not limited to, the regulations of the U.S. Postal Service.

Still referring to FIGS. 1A, 1B, 2, 3, 4 and 5, side 160*a* includes indicia 180 that defines three areas 200, 220, and optional area 240, which collectively define a postcard 260. Specifically, side 160*a* area 200 to attach postage, area 220 to write or print an address, and optional area 240 to write a message. The message area 240 is optional and therefore can be left out of the postcard 260.

One or more optional pictures, advertisements, graphics, text 280 are optionally printed, alone or in combination, on side 160*b*. The extendable handle 140 is shown attached to side 160*a* between optional message area 240 and the address area 220. However, it should be understood that the extendable handle 140 can be attached to either side 160*a* or 160*b*; in addition, the optional text and/or graphics 280 can be printed on either side 160*a* or 160*b*, the only issue is that the indicia defining postcard 260 is printed in such a manner that it is clearly visible to a mail worker and is preferably printed on the opposite side of blade 120 from the optional text/graphics 280.

It should be understood that the extendable handle 140 could be attached to either side 160*a* or 160*b* of unfolded fan blade 120. It should also be understood that the term "postage" is intended to mean adhesive stamps or printed indicia representing postal fees.

The extendable handle 140 comprises an elongated female receptacle member 300 and an elongated male member 320. The female receptacle member 300 and male member 320 can be made of any suitable material such as resilient plastic formed by pressure molding or similar method; examples of suitable plastic include, but are not limited to, plastic molded from Vinyl, Delrin or Velcron; Velcron has a spring characteristic, and can withstand repeated use. However, the female receptacle member 300 and elongated male member 320 can be made of other materials such as, but not limited to, rubber and/or metal.

As can be seen in FIGS. 1A to 5, the female receptacle member 300 has a generally rectangular cross-section, which in turn defines an interior bore 340 of general rectangular cross-section sized to slidably accommodate male member 320. It should be understood that the overall cross-section shape of the female receptacle member 300 and bore 340 can vary; for example, the female receptacle member 300 and bore 340 could have a semi-circular cross-section or part thereof so long as the contact area between the female receptacle member 300 and side 160*a* (or side 160*b*) is sufficient to promote or maintain stiffness in the unfolded fan blade 120.

Figure 3:
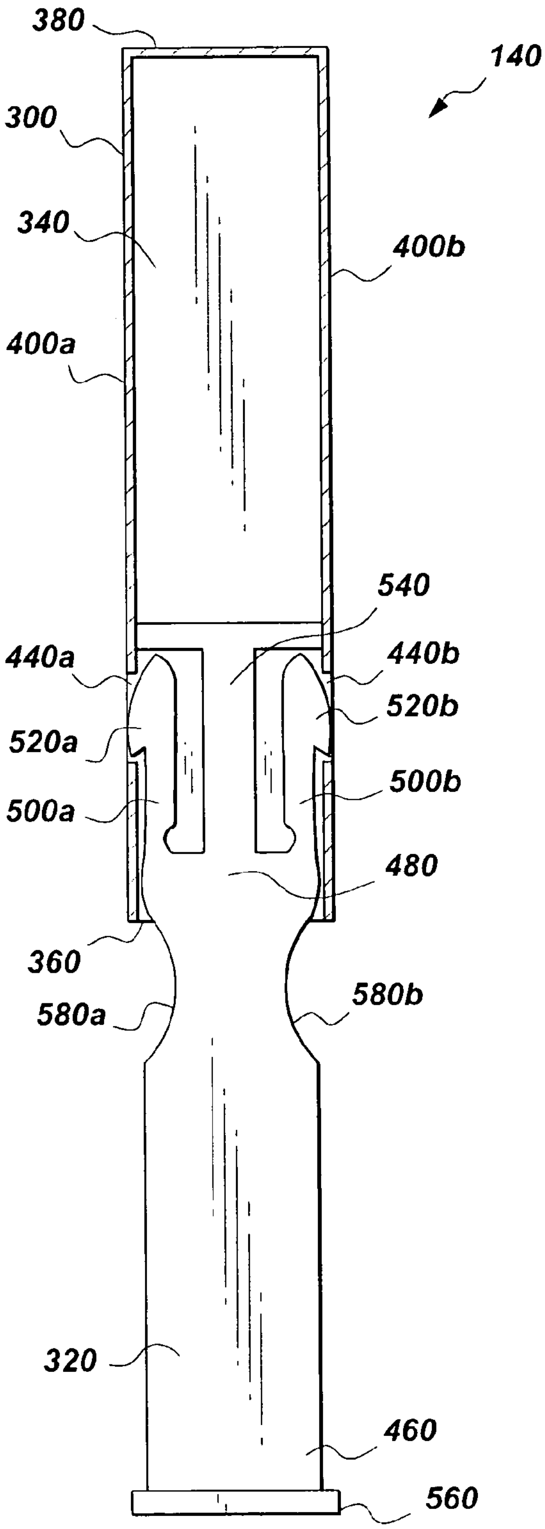
FIG. 3 is a partial cut-away top view of an extendable handle fitted to the mailable fan of FIG. 1A according to the present invention, the extendable handle is shown in its extended mode of operation.
Figure 4:
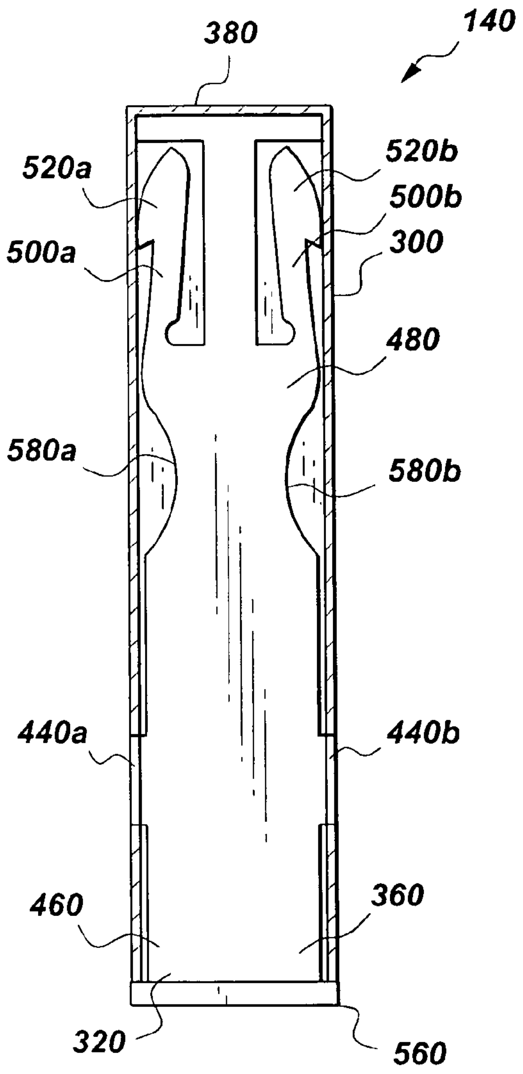
FIG. 4 is a partial cut-away top view of an extendable handle fitted to the mailable fan of FIG. 1A according to the present invention, the extendable handle is shown in its non-extended mode of operation.
Figure 5:
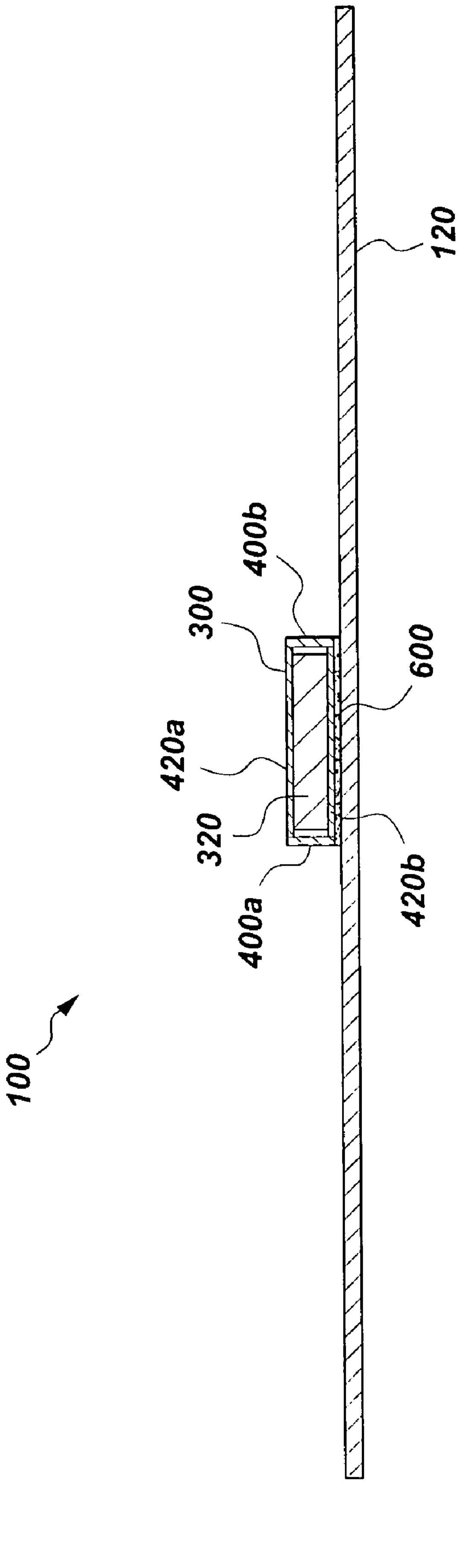
FIG. 5 is a section view of the mailable fan of FIG. 1A along line 5—5 according to the present invention.

Referring particularly to FIGS. 3, 4 and 5, the elongated male member 320 has opposite proximal and distal ends 460 and 480, respectively. The distal end 480 has lateral opposite facing latching arms 500*a* and 500*b*, which in turn have latching tabs 520*a* and 520*b*, respectively. The latching arms 500*a* and 500*b* are designed to flex slightly outwards to enable the latching tabs 520*a* and 520*b* to couple to latch slots 440*a* and 440*b* formed in the side walls 400*a* and 400*b*, respectively. Conversely, the latching arms 500*a* and 500*b* are also designed to flex slightly inwards in response to sideways pressure to enable the latching tabs 520*a* and 520*b* to be decoupled from the latch slots 440*a* and 440*b*, respectively.

Still referring to FIGS. 3 and 4, distal end 480 also includes a T-shaped, stabilizing central arm 540; specifically, the T-shaped stabilizing central arm 540 adds stability to the elongated male member 320 as it is slid forward or backward inside bore 340 of the female receptacle member 300. The length of the elongated member 320 is preferably about the same length of the bore 340; but it should be understood that the length of elongated male member 320 might be less than that of the bore 340.

An optional overlapping grip member 560 is attached to the proximal end 460; the optional grip member 560 enables a person to pull and push the elongated male member 320 outwards and inwards, respectively, along bore 340. The optional grip member 560 is wider than the proximal end 460 and can prevent the elongated member 320 traveling too far into the bore 340 particularly if the elongated member 320 is shorter in length than the receptacle's bore 340; however, the T-shaped stabilizing central arm 540 can also act as a stop if the elongated member 320 is of sufficient length to allow the T-shaped stabilizing central arm 540 to about against closed distal end 380 of female receptacle member 300. Optional opposite facing handholds 580*a* and 580*b* are located proximate to the distal end 480 as shown, for example, in FIG. 3.

Referring to FIGS. 3, 4 and 5, the female receptacle member 300 has proximal and distal ends 360 and 380, respectively, opposite sidewalls 400*a* and 400*b*, and opposite facing top and bottom walls 420*a* and 420*b* (see FIG. 5). Proximal end 360 is open and distal end 380 is closed (see, e.g., FIG. 3). A pair of coupling latch slots 440*a* and 440*b* are respectively positioned in facing relation in the side walls 400*a* and 400*b* near the proximal end 360 of female receptacle member 300. The latch slots 440*a* and 440*b* are sized to accommodate latch tabs 520*a* and 520*b* that form part of elongated male member 320.

Referring to FIGS. 1A and 5, any suitable adhesive compound such as a layer of glue 600 is used to attach bottom wall 420*b* to side 160*a* of unfolded fan blade 120 and thereby reinforce the structural integrity of the blade 120. The glue 600 can be applied to either the surface of side 160*a* and/or to the bottom wall 420*b*. The area of bottom wall 420*b* provides good contact area between the extendable handle 140 and the unfolded fan blade 120.

The elongated member 320 is prevented from exiting fully from the bore 340 by the action of the latching tabs 520*a* and 520*b* that cooperatively couple to the latch slots 440*a* and 440*b*, respectively, in sides 400*a* and 400*b* of female receptacle member 300. Latching tabs 520*a* and 520*b* are decoupled from the latch slots 440*a* and 440*b* by applying pressure to the latching tabs 520*a* and 520*b*.

Figure 6A:
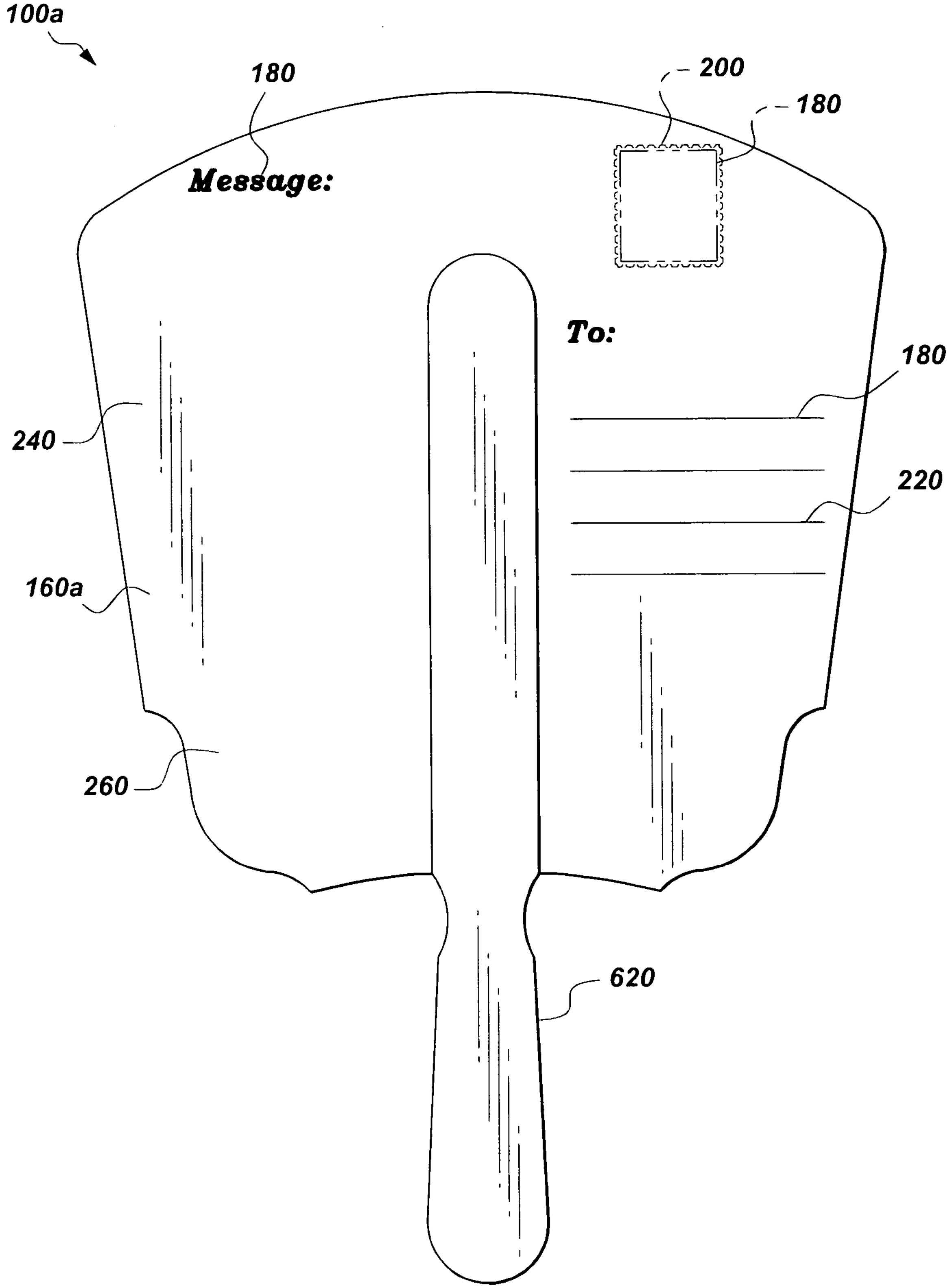
FIG. 6A is a top view of one side of another mailable fan according to the present invention.
Figure 6B:
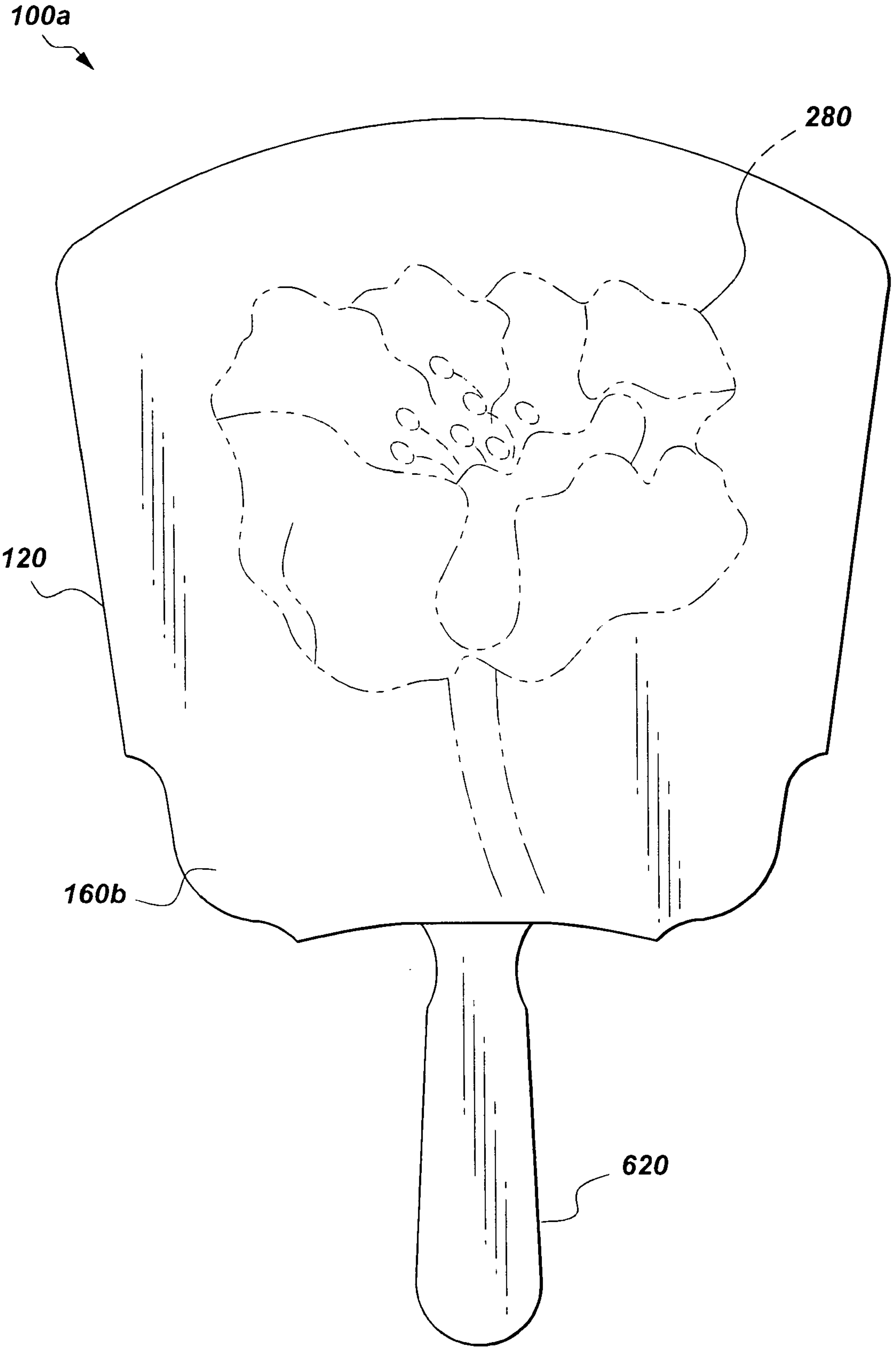
FIG. 6B is a bottom view of the mailable fan of FIG. 6A.

FIG. 6A shows a further embodiment of the mailable fan 100 according to the invention. In this embodiment, the mailable fan 100 (represented by the alpha-numeral "100*a*") takes the form of an unfolded fan blade 120 of any preferred shape. The unfolded fan blade 120 has two opposite sides 160*a* and 160*b*. Indicia 180 partitions side 160*a* into three areas 200, 220, and optional 240, which collectively define a postcard 260. Specifically, postcard 260 comprises an area 200 to attach or print postage, an optional area 240 to write a message, and an area 220 to write or print an address. A picture or advertisement 280 (not shown) is printed on side 160*b*. The non-extendable handle 620 is shown attached to side 160*a* between areas 220 and 240. It should be understood that the non-extendable handle 620 could be attached to either side 160*a* or 160*b* of unfolded fan blade 120.

Figure 7:
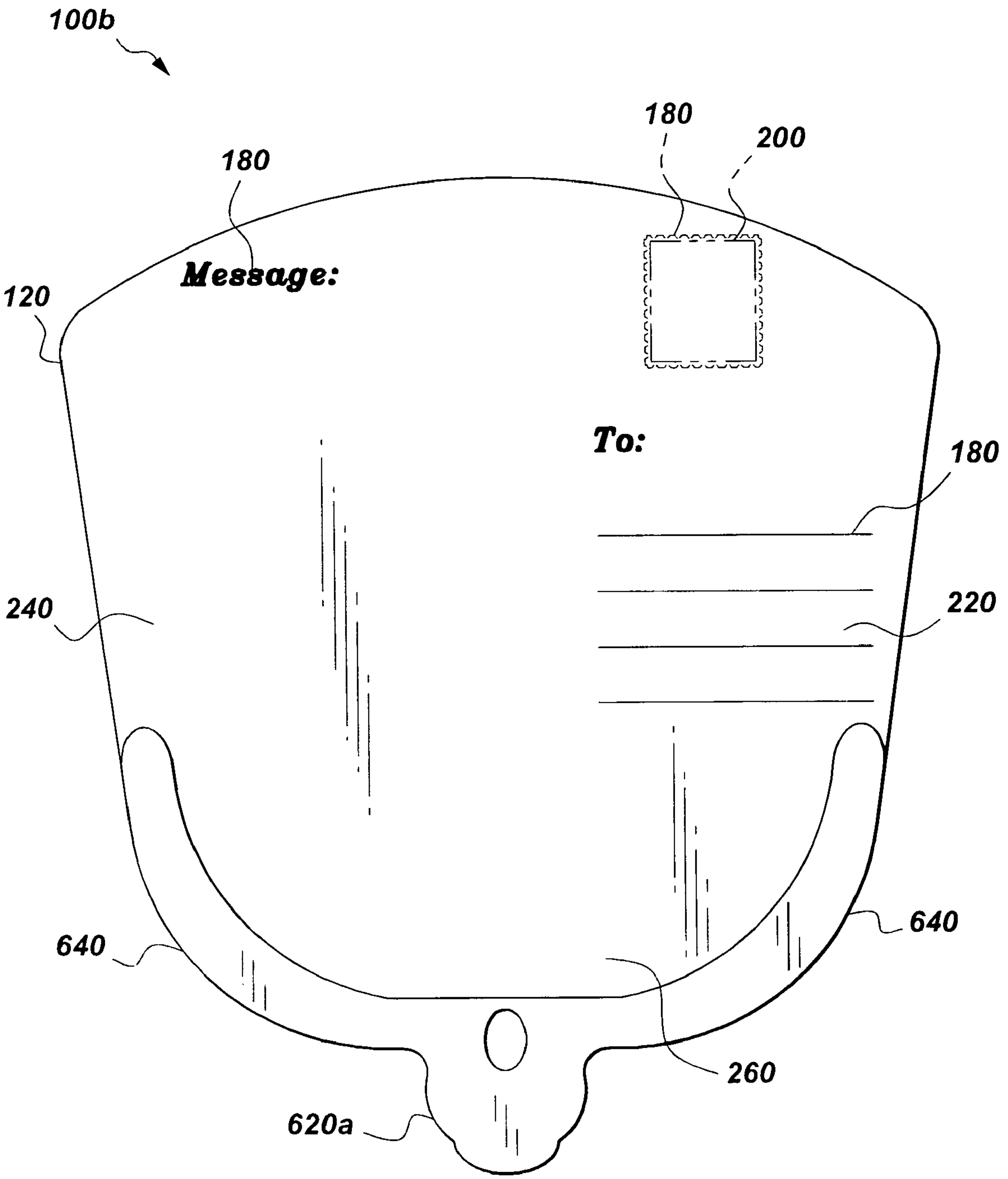
FIG. 7 is a top view of one side of another mailable fan according to the present invention.

FIG. 7 shows a further embodiment of the mailable fan 100 according to the invention; In this embodiment, the mailable fan 100 (represented by the alpha-numeral "100*b*") takes the form of an unfolded fan blade 120 of any preferred shape. In this embodiment, the mailable fan 100 takes the form of an unfolded fan blade 120 of any preferred shape and a non-extendable handle 620*a* much like that described in U.S. Pat. No. 1,126,797 issued Feb. 2, 1915 to M. Lichter (the "Lichter '797 patent"), however the Lichter '797 device is not suitable for mailing absent packing in a suitable envelop or packaging; the Lichter '797 patent is herein incorporated by reference in its entirety.

Still referring to FIG. 7, a shortened non-extendable handle 620*a* has outward extending lateral arms 640, approximately crescent shaped, and adapted to engaged with and be rigidly united to the lower sides and edges of the unfolded fan blade 120. The unfolded fan blade 120 has two opposite sides 160*a* and 160*b*. Indicia 180 partitions side 160*a* into three areas 200, 220, and optional 240, which collectively define a postcard 260. Specifically, postcard 260 comprises an area 200 to attach or print postage, an optional area 240 to write a message, and an area 220 to write or print an address. A picture or advertisement 280 (not shown) is printed on side 160*b*. The non-extendable handle 620*a* is shown attached to side 160*a* between areas 220 and 240. It should be understood that the non-extendable handle 620*a* could be attached to either side 160*a* or 160*b* of unfolded fan blade 120.

Figure 8:
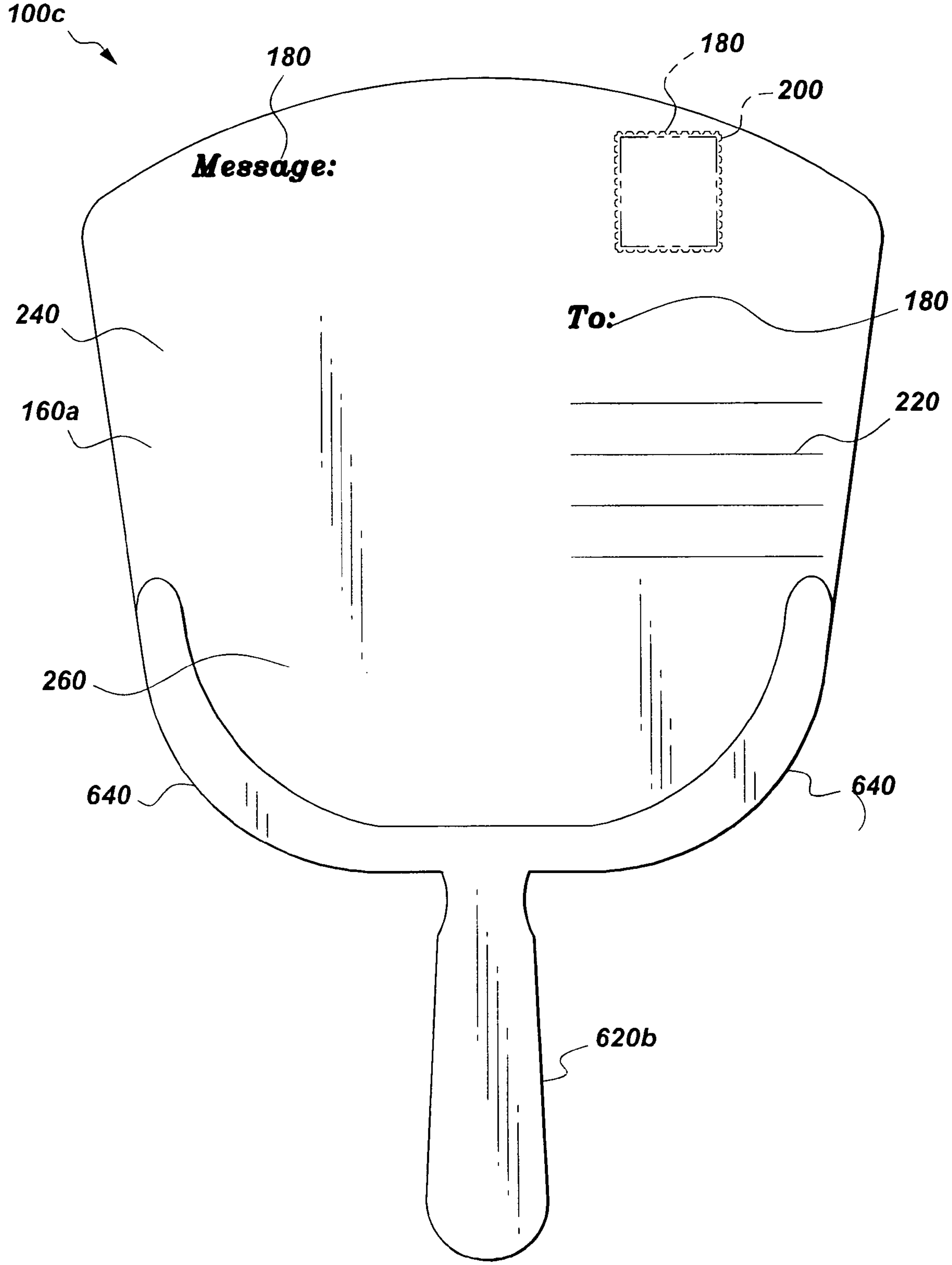
FIG. 8 is a top view of one side of a yet another mailable fan according to the present invention.

FIG. 8 shows a further embodiment of the mailable fan 100 according to the invention. In this embodiment, the mailable fan 100 (represented by the alpha-numeral "100*c*") takes the form of an unfolded fan blade 120 of any preferred shape and a non-extendable handle 620*b* that is similar to the handle shown in FIG. 7, except that the handle 620*b* is somewhat longer than handle 620*a*; non-extendable handle 620*b* has outward extending lateral arms 640. The unfolded fan blade 120 has two opposite sides 160*a* and 160*b*. Indicia 180 partitions side 160*a* into three areas 200, 220, and 240, which collectively define a postcard 260. Specifically, postcard 260 comprises an area 200 to attach a stamp, an optional area 240 to write a message, and an area 220 to write or print an address. A picture or advertisement 280 (not shown) is printed on side 160*b*. The non-extendable handle 620 is shown attached to side 160*a* between areas 220 and 240. It should be understood that the non-extendable handle 620 could be attached to either side 160*a* or 160*b* of unfolded fan blade 120.

Thus, the mailable fan 100 of the present invention serves the dual function of a postal card and a hand-held fan. It is to be understood that the present invention is not limited to the embodiments described above, but encompasses any and all embodiments within the scope of the following claims.

The invention claimed is:

1. A fan suitable for mailing, comprising:

an unfolded fan blade, said fan blade having opposite sides, wherein indicia are printed on one side of said fan blade, said indicia define an area to attach or print postage and an area to write or print an address; and an extendable handle attached to said fan blade, wherein said handle provides stiffness to said fan blade, wherein said extendable handle comprises an elongated female receptacle member and an elongated male member, said female member defines an interior bore sized to slidably accommodate said male member, said male and female member each have opposite proximal and distal ends, wherein the distal end of said male member comprises two lateral opposite facing latching arms, further wherein each of said latching arms further comprise a latching tab, and wherein said female member comprises two complementary latch slots to cooperatively hold said latching tabs.

2. The fan of claim 1, wherein said indicia further defines a message area for writing a message.

3. The fan of claim 1, wherein at least a part of said handle is attached to said fan blade between said address area and said message area.

4. The fan of claim 1, wherein pictures, advertisements, graphics, and text, alone or in combination, are printed on the other side of said fan.

5. The fan of claim 1, wherein said female receptacle has a rectangular cross-section, wherein one side of said female receptacle is glued to one side of said fan blade.

6. An unfolded fan suitable for mailing at a post office, comprising:

an unfolded fan blade, said fan blade having first and second sides;

an extendable handle attached to said fan blade; and indicia printed on said unfolded fan blade sufficient for allowing a person to mail said non-folding fan, wherein said extendable handle comprises an elongated female receptacle member and an elongated male member, said female member defines an interior bore sized to slidably accommodate said male member, said male and female member each have opposite proximal and distal ends, wherein the distal end of said male member comprises two lateral opposite facing latching arms, further wherein each of said latching arms further comprise a latching tab, and wherein said female member comprises two complementary latch slots to cooperatively hold said latching tabs.

7. The fan according to claim 6, wherein said interior bore is of general rectangular cross-section sized to slidably accommodate said male member.

8. A method of mailing fans, comprising:

(a) providing a non-folded fan, wherein said non-folded fan comprises:

two opposite sides, an extendable handle, indicia printed on one opposite side of said non-folded fan, wherein said indicia defines a postcard, and promotional material printed on the other opposite side of said non-folded fan; and (b) mailing said non-folded fan, wherein said extendable handle comprises an elongated female receptacle member and an elongated male member, said female member defines an interior bore sized to slidably accommodate said male member, said male and female member each have opposite proximal and distal ends, wherein the distal end of said male member comprises two lateral opposite facing latching arms, further wherein each of said latching arms further comprise a latching tab, wherein said female member comprises two complementary latch slots to cooperatively hold said latching tabs, whereby said postcard enables said non-folded fan to be mailed by adding appropriate postage to said postcard thereby obviating the need to place said non-folded fan into an envelope or package prior to step (b) mailing said non-folded fan.

9. The fan according to claim 1, wherein said female member defines an interior bore of general rectangular cross-section sized to slidably accommodate said male member, said male and female member each have opposite proximal and distal ends, wherein the distal end of said male member comprises two lateral opposite facing latching arms, further wherein each of said latching arms further comprise a latching tab, wherein said female member comprises two complementary latch slots to cooperatively hold said latching tabs.

* * * * *